(12) United States Patent
Balabanovic et al.

(10) Patent No.: US 6,895,552 B1
(45) Date of Patent: May 17, 2005

(54) METHOD AND AN APPARATUS FOR VISUAL SUMMARIZATION OF DOCUMENTS

(75) Inventors: Marko Balabanovic, London (GB); Dar-Shyang Lee, Union City, CA (US)

(73) Assignee: Ricoh Co., Ltd., Tokyo (JP)

( * ) Notice: Subject to any disclaimer, the term of this patent is extended or adjusted under 35 U.S.C. 154(b) by 829 days.

(21) Appl. No.: 09/585,713

(22) Filed: May 31, 2000

(51) Int. Cl.[7] .......................... G06F 17/18; G06F 17/00
(52) U.S. Cl. ........................ 715/513; 707/7; 707/104
(58) Field of Search .......................... 715/517, 513; 707/102, 104, 7; 345/635; 382/305; 358/403

(56) References Cited

U.S. PATENT DOCUMENTS

| | | | | |
|---|---|---|---|---|
| 5,983,237 A | * | 11/1999 | Jain et al. ................. | 707/104.1 |
| 5,999,664 A | * | 12/1999 | Mahoney et al. ........... | 382/305 |
| 6,181,342 B1 | * | 1/2001 | Niblack ....................... | 345/635 |
| 6,281,986 B1 | * | 8/2001 | Form ........................... | 358/403 |
| 6,562,077 B2 | * | 5/2003 | Bobrow et al. .............. | 715/517 |
| 6,564,202 B1 | * | 5/2003 | Schuetze et al. ............... | 707/2 |
| 6,574,632 B2 | * | 6/2003 | Fox et al. .................... | 707/102 |

* cited by examiner

*Primary Examiner*—Sanjiv Shah
(74) *Attorney, Agent, or Firm*—Blakely, Sokoloff, Taylor & Zafman LLP

(57) ABSTRACT

A system and a method for visually summarizing a document comprising a display, a processor coupled to the display, and a memory coupled to the processor. Stored in the memory is a routine, which when executed by the processor, causes the processor to generate display data. The routine causes the processor to generate data through extracting at least one visual feature from a document having a plurality of pages, ranking the pages in a document, selecting a page for representing a document according to the visual feature, and displaying the selected page as display data.

32 Claims, 2 Drawing Sheets

US 6,895,552 B1

METHOD AND AN APPARATUS FOR VISUAL SUMMARIZATION OF DOCUMENTS

FIELD OF THE INVENTION

The invention relates generally to displaying information on a graphic user interface ("GUI") and more specifically to displaying information in such a way as to quickly and easily communicate information to a user.

DESCRIPTION OF RELATED ART

Computers and other electronic devices with GUI's are used to communicate information. A part of this communication process involves displaying information on a GUI in an efficient manner. In many retrieval and browsing user interfaces, documents are represented by scaled-down images. For example, if the document contains multiple pages, each page may be represented by a separate icon. If each page of a document is represented by an icon, many icons are needed to display a large document. This approach is generally too cumbersome to use. In an alternative approach, a single icon may be used to represent the entire document. Generally, the first page of the document is arbitrarily chosen to represent the document regardless of whether the visual appearance of the first page provides a visual cue for association with that particular document. It is therefore desirable to have a system to represent documents or other items such that information about a document or item is easily relayed to and understandable by a user.

SUMMARY OF THE INVENTION

A computer system is disclosed that comprises a display, a processor coupled to the display, and a memory coupled to the processor. Stored in the memory is a routine, which when executed by the processor, causes the processor to generate display data. The routine includes extracting at least one visual feature from a document having a plurality of pages, ranking the pages in the document according to the at least one visual feature, selecting a page for representing a document according to a rank, and displaying the selected page as the display data. Additional features, embodiments, and benefits win be evident in view of the figures and detailed description presented herein.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

Figure 1A:
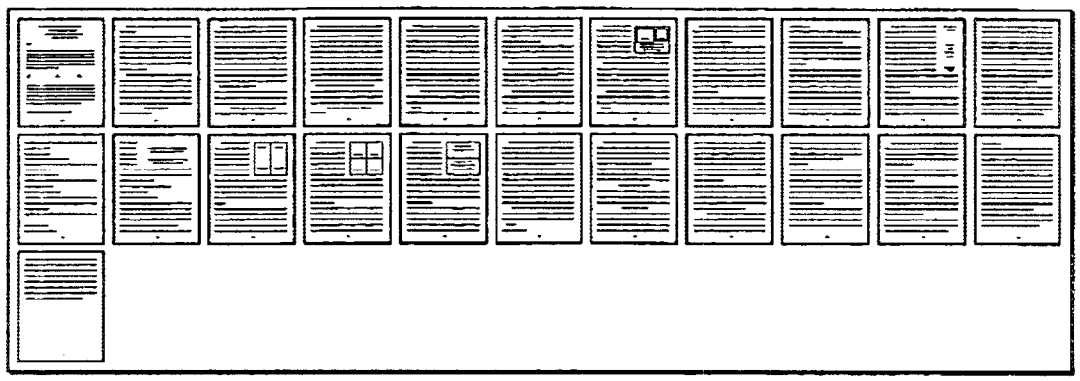
FIG. 1A illustrates thumbnails of all the pages in a document.

A method and apparatus for generating and displaying a visual summarization of a document is described. In one embodiment, a technique described herein extracts visual features from the document and ranks multiple pages of a document based upon at least one or more visual features of the page. The pages may be presented on a graphical user interface (GUI) to a user with features being displayed that are ranked higher.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Techniques described herein provide a scheme to rank page icons (e.g., thumbnails) according to their visual saliency. The rankings may be used to select certain pages, preferably those with more salient features, for display. This solution may result in increasing the ease of document recall as opposed to display only the first set of pages of a document with reduced sized images to provide a visual clue as to the contents of a document. Additionally, techniques described herein also provide for various effective representations of document content in applications with limited display size.

Figure 1B:
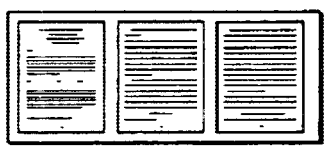
FIG. 1B illustrates the first three pages.
Figure 2A:
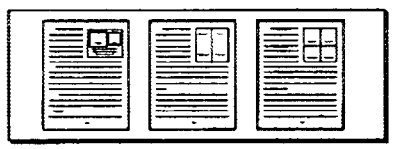
FIG. 2A illustrates a first row of icons corresponding to the three most visually significant pages of a document.
Figure 2B:
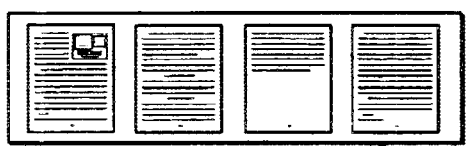
FIG. 2B illustrates pages that contain distinctly different visual differences.

FIG. 1A illustrates thumbnails of all the pages in a document. FIG. 1B illustrates the first three pages, arbitrarily chosen, does not help recall the document. By showing pages with the most salient features, as shown in FIG. 2A, or pages with distinctly different visual appearances, as shown in FIG. 2B, a user is provided, generally, with more information to recall a particular document. Utilizing visual saliency and distinctive features, a more compact representation of all pages in a document may be obtained as illustrated in FIG. 3.

Figure 3:
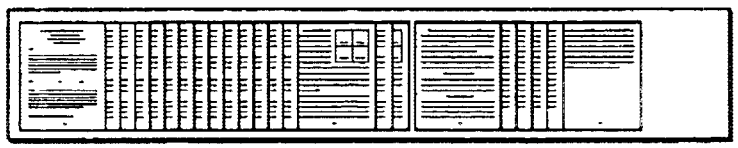
FIG. 3 illustrates a more compact representation of all the pages in a document.

The representations in FIGS. 2A, 2B, and 3, and other suitable representations, are possible using a combination of components such as, for example, features that describe visual characteristics of a document image, feature extraction and representation scheme, and a measure of visual saliency. Each of these features are described below.

A set of features capable of describing the visual characteristics of a document image include textural and layout feature information. Textural features may include one or more of position, size, ink density, line spacing, color and contrast. Layout features may include one or more of configuration of blocks (e.g., column, header, etc.) or types of blocks (e.g., picture, line art, text, etc.). Features that are known to play a significant role in human perception and memory, such as, for example, surrounding space, letter height, bold, bullets, indentation, all capitalization, italics, underlining and other suitable features.

The features extraction/representation scheme component involves the use of document analysis systems that are capable of segmenting blocks, detecting font sizes within blocks, and extracting other relevant information, such as, for example, the textural and layout features described above. Although visual information is naturally conveyed by a description language, in one embodiment a vector representation is used instead to facilitate applications of various techniques developed for information retrieval.

The measure of visual saliency may be based upon a variety of factors such as, for example, psychological experiments that provide some guidelines for designing this component. For instance, it has been determined that pictures tend to draw more attention than text blocks and character size is more significant than character style. The presence of attractive features contributes to the total visual saliency of the page. Optionally, this visual saliency component can also be normalized using schemes similar to term weighting for text retrieval to account for features common to all documents in a database.

Utilizing these components, visual features are first extracted for all pages in a database using methods known in the art. Pages in a document are then ranked according to their visual significance and uniqueness. The user or system designer may determine which visual features are significant or unique. Since the number of different visual features may be quite large, the visual features chosen by a user or a system designer may also be quite large. The ranking serves as the basis for the selection of representing icons in FIG. 2A.

In addition to ranking pages, visual features may also be used to provide a distance measure between documents. If the visual features are represented in vector form, as is typically done in image-based retrieval techniques, conventional information retrieval techniques as developed for a vector space model may be applied to produce effective iconic document representations. For example, clustering of the pages may reveal distinct page types as shown in FIG. 2B. While clustering of images is commonly performed as a navigation aid to find similar documents, clustering is used within a document having multiple pages. This is analogous to finding "keyframes" in a video.

Treating pages in a document as frames in a sequence may also lead to compact representations. "Scene changes" can be detected by comparing the visual distance between two consecutive pages to a threshold, by looking for transitions to different page types subsequent to clustering as described above, or by other variations such as, for example, combining visual saliency scores. When the distance between consecutive pages is very small, only one of the two needs to be selected. Sequence of visually similar or uninteresting pages may be stacked to reduce space required as illustrated in FIG. 3. It will be appreciated that these components may be utilized independently or in combination with one another to create other novel usages.

An Exemplary Algorithm

The visual summarization system described herein uses a source document as input. In the first phase of the process, a number of, for example, color bitmaps are generated. Each bitmap represents a separate page of the source document. Visual features are then extracted from these bitmaps using document analysis techniques. Two functions Saliency and VisualDist defined over these features enable the effects shown in FIGS. 2A, 2B, 3.

The techniques described herein may operate on a variety of document types by using the feature extraction process that is assumed to utilize common commercial optical character recognition (OCR) systems and operates on the most common denominator for document representation: image bitmaps. The bitmap generation process is described for several common document formats, such as, for example, paper documents, postscript, portable document format (PDF), hypertext markup language (HTML) and Word documents. Although it is also possible to develop feature extraction modules designed specifically for each document type, using a common representation simplifies the algorithm description. Generalization to other document media may also be similarly derived.

Bitmap Generation

Generating a bitmap can be used for any type of computer-generated source document. However, on occasion it may be more efficient or convenient to use a specific method based on a particular type of source document. The following description provides a general method and several type-specific methods.

On an operating system ("OS") such as Microsoft Windows, a printer driver is a software application that translates rendering commands from some controlling application into a printable representation of a document. A user typically has installed one printer driver for each different type of printer in which access is granted.

Given a source document S generated by application A, the general methodology operates as follows. The user runs application A, loads document S, and selects the "print" function. The user then selects a printer driver that, instead of sending its output to a printer, creates a number of color bitmap images. The document is paginated just as if it was to be printed. The user optionally has control of font sizes and target paper size, depending on the application A.

Techniques for creating such a printer driver are known in the art since it does not differ significantly from any other printer driver. It is assumed that a bitmap corresponds to a page intended for a printer according to a default dots-per-inch factor. Therefore, an 8.5×11" page corresponds to, for example, a 612×792 bitmap with a 72 dpi factor.

In an alternative embodiment, the user selects an existing printer driver that generates Postscript™ output (such drivers are commonly available as part of an OS or through suppliers such as Adobe Inc), and selects the "Print to File" option. In this way, a postscript file can be generated from an arbitrary source document. This postscript file, in turn, can be transformed into a number of bitmap images.

Tools for using HTML to create bitmap images are known in the art. Such tools are available from Sun such as HotJava™, Microsoft such as Internet Explorer ActiveX™ control and AOL such as Netscape Mozilla™ project. Such a tool can further use Dynamic HTML, XML, Style Sheets and further markup languages.

In using HTML, there are two choices that determine the size of the final output: target page width and font size. One page width to select is the screen resolution width of an average user, for instance 800 pixels. An alternative is to assume the width of a standard letter-size page, 8.5 inches. Similarly, font size can be chosen to match the default setting on a standard Web browser, e.g., 12 point Times Roman font for variable-width characters.

Tools for rendering PDF files are known in the art. Since PDF includes information about page size, orientation, and font size, no further information is required.

Tools for rendering Postcript™ files are known in the art. Since Postcript™ includes information about page size, orientation, and font size, no further information is required.

In addition to the methods above that relate to computer-generated documents, any paper document can also be used as input. A scanning device which is known in the art can turn the paper document directly into a color bitmap per page.

Feature Extraction

After image bitmaps are obtained for individual document pages, conventional document analysis techniques may be applied to extract visual features. Commercial OCR systems such as Xerox ScanWorX commonly provide basic layout information and character interpretations. A single document page is often decomposed into blocks of text, pictures, or figures. For text blocks, word bounding boxes and font size are estimated. Since most commercial systems operate on binary or gray scale images, color images can be converted to a monochrome version first for block analysis. Color constituents can be subsequently extracted by superimposing the color image with segmented block information.

The end result of document analysis is a set of feature descriptions for each document page. More specifically, for each page, a list of segmented blocks is obtained. Each segmented block is categorized as text, a picture, or line art. The location and color composition of each block are also known. In order to proceed to use the algorithm described above, a suitable representation should be chosen. Therefore, it is assumed that a simple statistical representation is used, although other representations, even symbolic, are also possible.

A document image is divided into mxn grids. For each uniquely numbered square in the grid, $g_i$, $1 \leq i \leq m \cdot n$, five features are recorded. The first three features, $t_i$, $p_i$, and $f_i$, indicate portions of the grid area which overlap with a text, picture or line art block, respectively. For example, if entire area under the grid belongs to a text block, $t_i=1$, $p_i=f_i=0$. If the left one third area overlaps a text block, the right one third overlaps a picture, and the middle one third contains white background, then $t_i=1$, $p_i=0.33$ and $f_i=0$. The next two features, $b_i$ and $c_i$, contain the color information of grid content. Colors may be represented by their brightness, hue, and saturation attributes. The brightness attribute represents the observed luminance and is monochromatic. The hue attribute indicates the degree of "redness" or "greenness". The saturation attribute reflects the pureness of the hue. Although human perception is more sensitive to certain color tone than others, it is assumed that visual significance is independent of the hue in the simplified representation and only the "average brightness" and "average color pureness" is recorded. Feature $b_i$ measures the average "blackness" inside a grid. More precisely, it is the average brightness value for pixels in the grid in reverse and normalized such that if all pixels inside a grid are pure black, $b_i=1$. This feature is equivalent to the "ink density" feature frequently used in conventional document analysis of bitonal images. Feature $c_i$ is the average saturation value for pixels in the grid, also normalized between 0 and 1. Therefore, a gray-scale image has only a brightness value but no saturation attribute. In contrast, a grid containing color pixels will have a non-zero $c_i$ value.

Consequently, the visual information in a given page is represented by a vector $$\vec{v}$$

with dimension 5*m*n, which can be considered as a concatenation of 5 vectors $$\vec{t}, \vec{p}, \vec{f}, \vec{b}, \vec{c}$$

each of m*n dimensions. A document consisting of k pages will be represented by k vectors $$\vec{v}_1 \ldots \vec{v}_k.$$

Elements in these vectors all have values between 0 and 1. However, they do not have to sum to 1.

Visual Saliency Evaluation

The simplest form of visual saliency is evaluated on a per-page basis independent of other pages in the same document or database. This is achieved by assigning a weight to each visual features. For example, since colors are more noticeable than grays, and pictures are more visually significant than line arts and text, a reasonable weighting for the 5 features is $w_t=0.1$, $w_f=0.4$, $w_p=1$, $w_b=0.8$, $w_c=2$. The saliency score for a page is then computed as $$\text{Saliency}(\vec{v}) = w_t \cdot \sum_i t_i + w_f \cdot \sum_i f_i + w_p \cdot \sum_i p_i + w_b \cdot \sum_i b_i + w_c \cdot \sum_i c_i$$

Although, in this example, the weights are applied uniformly across the page, the weights may be made to reflect the positional variance in human perception. For instance, different weights may be assigned to $w_c(i)$ depending on the location of (i) to emphasize the significance of colors when occurring in the middle of a page versus on the top or bottom of a page. Therefore, a more general equation for saliency is $$\text{Saliency}(\vec{v}) = \sum_i w_t(i) \cdot t_i + \sum_i w_f(i) \cdot f_i + \sum_i w_p(i) \cdot p_i + \sum_i w_b(i) \cdot b_i + \sum_i w_c(i) \cdot c_i$$

Using the function Saliency, pages in a document can thus be ranked according to visual distinctiveness, and selected to represent the document, as shown in FIG. 2A.

Relative Saliency

Since one purpose of using visually salient icons is to aid the retrieval of documents, in one embodiment, the icon selection criterion considers common characteristics of other documents in the collection of documents. For example, the significance of a page containing a red picture in one corner is diminished if all pages in the database have the same characteristic. This situation is quite possible in special collections where all documents contain the same logo or other types of marking. This problem is known in information retrieval and is typically dealt with by incorporating a database norm into the equation. By using a centroid subtraction method, similar types of correction mechanisms may be applied to the techniques described herein.

Given a collection of documents, the centroid is the average visual feature vector of all pages. To discount properties common to all documents in the database, the centroid is subtracted from individual feature vectors before saliency calculation. In other words, $$\text{RelSaliency}(\vec{v}) = \text{Saliency}(|\vec{v} - \vec{u}|)$$

where $\vec{u}$ is the centroid vector. Thus, in one embodiment, saliency is evaluated based on features that are "out-of-normal" in the database. Using the example presented above, if all pages in the database contain a red picture at grid position i, then the average value of $c_i$ will be fairly high. Therefore, a page that does not have a red picture in the corner should be more noticeable. In this case, if $c_i=0$ in this page, which a high value will result after subtracting the average $c_i$ in the centroid. In this example, since we are ignoring hue, a page that has a picture in that position, regardless of color, will have a high $c_i$ value. In contrast, a page that does not have any color in that position will stand out.

Visual Distance

To measure the visual difference between two pages, the Saliency function may be applied to the absolute values of the differences between corresponding features.

$$\text{VisualDist}(\vec{v}_1, \vec{v}_2) = \text{Saliency}(|\vec{v}_1 - \vec{v}_2|)$$

VisualDist takes a grid by grid accounting of the discrepancies in texture and color between at least two pages and then assesses the visual saliency of the total difference. The portion $$|\vec{v}_1 - \vec{v}_2|$$

generates a vector whose elements are all between 0 and 1. While the $L_2$ norm is most frequently used (or misused) to measure the distance between two vectors regardless whether a uniform numeric scale applies to all components, this measure appears to be more suitable to describing what a visual difference is and how visually significant that difference may be.

One application of the visual distance is to produce a condensed representation of a multi-page document, as shown in FIG. 3. The visual difference between every two consecutive pages determines the amount of overlapping that exists; therefore, only significantly different-looking pages are shown in full. Since VisualDist is a distance metric, it can be used to cluster all, pages in a document, or pages in a collection of documents. Pages are first grouped by their visual similarities. Thereafter, an exemplar page for each cluster is selected by picking the page whose feature vector is closest to the cluster center. This produces the exemplar pages of a document as seen in FIG. 2B.

Icon Display

It will be appreciated that although FIGS. 2A, 2B, 3 illustrate example of displays of icons created using the techniques of the invention, other arrangements are possible. The scheme may adapt to the amount of space available by picking out a smaller or a larger number of page icons. The amount of space can be specified by an external constraint (e.g., physical display size), by a system designer, or by a user (e.g., if the icon is displayed within a resizable box), the amount of space can also be a variable. For example, the number of page icons that are shown may depend on the number of clusters found within the document, the length of the document, the number of pages whose visual saliency is above some predetermined threshold, or the connection bandwidth.

The scheme of icons may adapt to the shape of the space available. FIG. 3 shows a linear display. The same information may be shown as a sequence of lines of page icons, for a square or rectangular shape, or as stacks of distinct-looking pages. Alternatively, the icons may be arranged around a circle or oval. In general, an ordered set of icons may follow any arbitrary path.

The generated icons are suitable for use in a graphical user interface, where they can be generated on-the-fly, for printed use, where they are generated ahead of time, or for use on the Web or in multimedia presentation formats.

Figure 4:
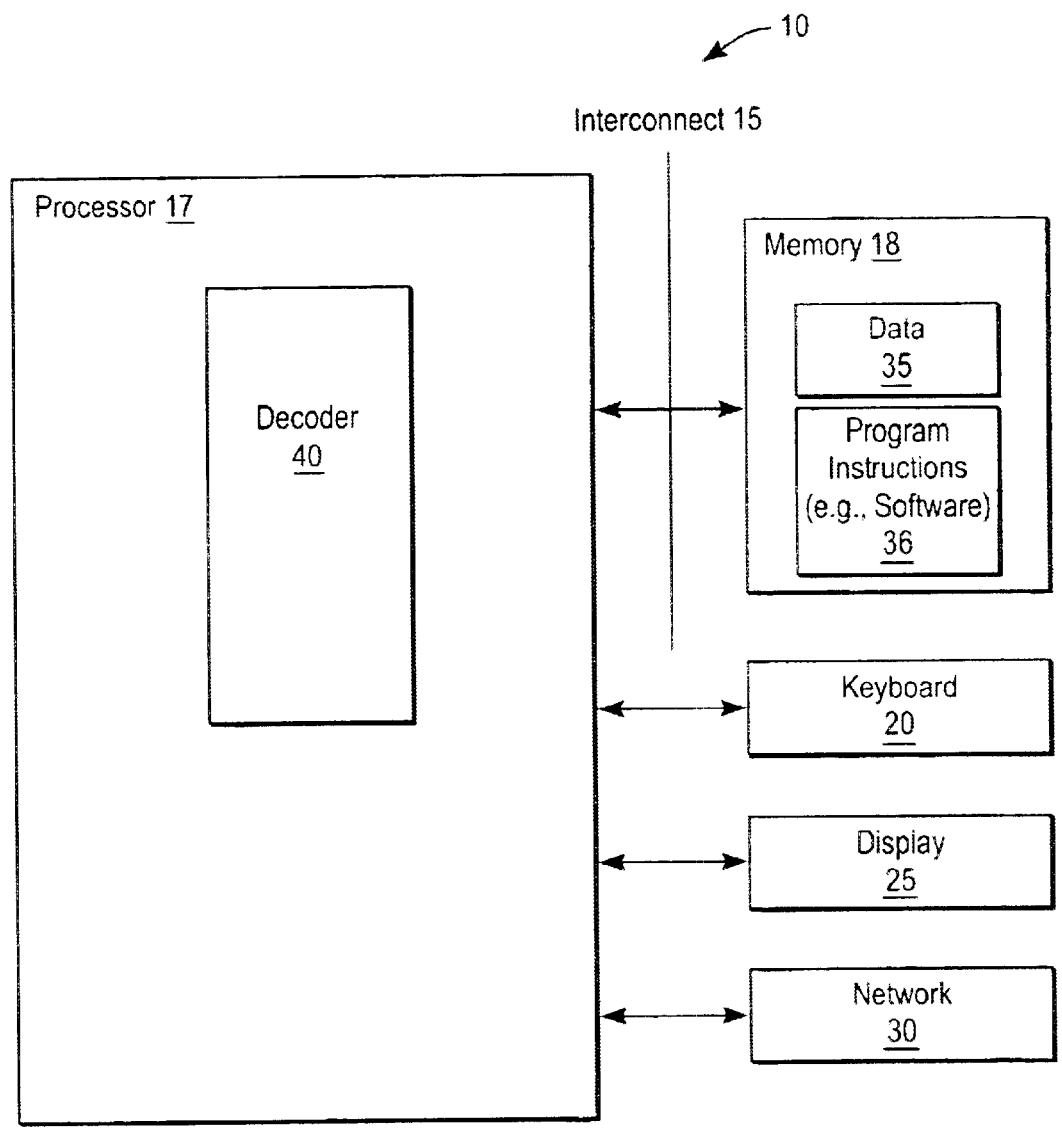
FIG. 4 illustrates one embodiment of a computer system.

FIG. 4 illustrates one embodiment of a computer system 10 which implements the principles of the present invention. Computer system 10 comprises a processor 17, a memory 18, and interconnect 15 such as a bus or a point-to-point link. Processor 17 is coupled to memory 18 by interconnect 15. In addition, a number of user input/output devices, such as a keyboard 20 and display 25, are coupled to a chip set (not shown) which is then connected to processor 17. The chipset (not shown) is typically connected to processor 17 using an interconnect that is separate from interconnect 15.

Processor 17 represents a central processing unit of any type of architecture (e.g., the Intel architecture, Hewlett Packard architecture, Sun Microsystems architecture, IBM architecture, etc.), or hybrid architecture. In addition, processor 17 could be implemented on one or more chips. Memory 18 represents one or more mechanisms for storing data such as the number of times the code is checked and the results of checking the code. Memory 18 may include read only memory ("ROM"), random access memory ("RAM"), magnetic disk storage mediums, optical storage mediums, flash memory devices, and/or other machine-readable mediums. In one embodiment, interconnect 15 represents one or more buses (e.g., accelerated graphics port bus, peripheral component interconnect bus, industry standard architecture bus, X-Bus, video electronics standards association related to buses, etc.) and bridges (also termed bus controllers).

While this embodiment is described in relation to a single processor computer system, the invention could be implemented in a multi-processor computer system or environment. In addition to other devices, one or more of network 30 may be present. Network 30 represents one or more network connections for transmitting data over a machine readable media. The invention could also be implemented on multiple computers connected via such a network.

FIG. 4 also illustrates that memory 18 has stored therein data 35 and program instructions (e.g. software, computer program, etc.). 36. Data 35 represents data stored in one or more of the formats described herein. Program instructions 36 represent the necessary code for performing any and/or all of the techniques described with reference to FIGS. 2A, 2B and 3 do. Program instructions may be stored in a computer readable storage medium, such as any type of disk including floppy disks, optical disks, CD-ROMs, and magnetic-optical disks, ROMs, RAMs, erasable programmable read only memories ("EPROM"s), electrically erasable programmable memories ("EEPROM"s), magnetic or optical cards, or any type of media suitable for storing electronic instructions, and each coupled to a computer system bus. It will be recognized by one of ordinary skill in the art that memory 18 preferably contains additional software (not shown), which is not necessary to understanding the invention.

FIG. 4 additionally illustrates that processor 17 includes decoder 40. Decoder 40 is used for decoding instructions received by processor 17 into control signals and/or microcode entry points. In response to these control signals and/or microcode entry points, decoder 40 performs the appropriate operations.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   extracting at least one visual feature from a document, the document having a plurality of pages, wherein at least one visual feature is weighted based on one of gradations and a location of the visual feature;
   ranking each of the pages in the document based on the at least one visual feature, wherein the ranking is performed based on a similarity relationship between content of the respective page and the at least one visual feature; and
   displaying page icons representing the pages of the document in an order based on a result of the ranking.

2. The method of claim 1 wherein the visual feature is one of a picture, a text block, a character size, a character style, and a color, wherein each type of the visual features is assigned with a weight value representing a weight of the respective type used in the ranking.

3. The method of claim 1 further comprising performing a saliency evaluation on each of the pages within the document to identify one or more pages that are significantly different from a remainder of the pages, using the at least one visual feature.

4. The method of claim 3 wherein the visual feature is represented in a vector form, and wherein performing saliency evaluation further comprises:
   determining a centroid representing an average visual feature vector of the pages;
   subtracting the determined centroid from a visual feature vector of each individual of the pages to reduce common characteristics of the visual feature vectors of the pages.

5. The method of claim 3, wherein pages having a significantly higher saliency are displayed as a full image within the respective page icon while a remainder of the pages are displayed partially.

6. The method of claim 1 wherein the visual feature is used as a distance measure between a first and a second consecutive pages within the document, the distance measure representing a visual difference between the first and second consecutive pages.

7. The method of claim 6, wherein the first and second consecutive pages of the document are displayed in overlap, and wherein an amount of overlapping is determined based on the distance measure represented by the visual features of the first and second consecutive pages.

8. The method of claim 1, further comprising clustering of a plurality of pages of the document into one or more clusters based on visual similarities of the pages with respect to the at least one visual feature.

9. The method of claim 8, further comprising:
   selecting an exemplar page from each cluster to form exemplar pages of the document, the exemplar page of each cluster having a visual feature vector closest to a center of the respective cluster; and
   displaying the exemplar page of the document using one or more page icons.

10. The method of claim 8, wherein a page having a most saliency among the pages of a respective cluster is displayed in full image, while a remainder of the pages in the respective cluster is displayed partially.

11. The method of claim 1 further comprising using visual features to reveal a transition from a first page to a second page of a document.

12. The method of claim 1, wherein ranking of the pages includes a correction mechanism.

13. The method of claim 1, wherein a scheme showing one of a plurality of pages in a document and a plurality of documents is by one of a linear display, a line of icons, and as a stack.

14. A computer system comprising:
   a display;
   a processor coupled to the display; and
   a memory coupled to the processor and having stored therein a routine, which when executed by the processor, causes the processor to generate display data through:
   extracting at least one visual feature from a document, the document having a plurality of pages, wherein at least one visual feature is weight based on one of gradations and a location of the visual feature;
   ranking the pages in the document according to the at least one visual feature, wherein the ranking is performed based on a similarity relationship between content of the respective page and the at least one visual feature, selecting a page for representing a document according to a result of the ranking, and displaying the selected page as the display data.

15. The computer system of claim 14 wherein the visual feature is one of a picture, a text block, a character size, a character style, and a color, wherein each type of the visual features is assigned with a weight value representing a weight of the respective type used in the ranking.

16. The computer system of claim 14 further comprising performing a saliency evaluation on each of the pages within the document to identify one or more pages that are significantly different from a remainder of the pages, using the at least one visual feature.

17. The computer system of claim 16 wherein the visual feature is represented in a vector form, and wherein performing saliency evaluation further comprises:

determining a centroid representing an average visual feature vector of the pages; subtracting the determined centroid from a visual feature vector of each individual of the pages to reduce common characteristics of the visual feature vectors of the pages.

18. The computer system of claim 14 wherein the visual feature is used as a distance measure between a first and a second consecutive pages within the documents, the distance measure representing a visual difference between the first and second consecutive pages.

19. The computer system of claim 14, wherein generating display data further comprises clustering of a plurality of pages of the document into one or more clusters based on visual similarities of the pages with respect to the at least one visual feature.

20. The computer system of claim 14, wherein a plurality of pages are selected and generating display data further comprises using visual features to reveal a transition from a first page to a second page of a document.

21. The computer system of claim 14, wherein ranking the pages includes a correction mechanism.

22. The computer system of claim 14, wherein a scheme showing one of a plurality of pages in a document and a plurality of documents is by one of a linear display, a line of icons, and as a stack.

23. An article of manufacture having at least one machine readable storage media containing executable program instructions which when executed by a digital processing system caused the digital processing system to:

extract at least one visual feature from a document, the document having a plurality of pages, wherein at least one visual feature is weighted based on one of gradations and a location of the visual feature, rank pages in the document based on said at least one visual feature, wherein the ranking is performed based on a similarity relationship between content of the respective page and the at least one visual feature, select the pages for representing a document based on a result of the ranking, and display selected pages.

24. The machine readable storage media of claim 23, wherein the visual feature is one of a picture, a text block, a character size, a character style, and a color, wherein each type of the visual features is assigned with a weight value representing a weight of the respective type used in the ranking.

25. The machine readable storage media of claim 23, further comprising performing a saliency evaluation on each of the pages within the document to identify one or more pages that are significantly different from a remainder of the pages, using the at least one visual feature.

26. The machine readable storage media of claim 23 wherein the visual feature is represented in a vector form, and wherein performing saliency evaluation further comprises:

determining a centroid representing an average visual feature vector of the pages; subtracting the determined centroid from a visual feature vector of each individual of the pages to reduce common characteristics of the visual feature vectors of the pages.

27. The machine readable storage media of claim 23, wherein the visual feature is used as a distance measure between a first and a second consecutive pages within the document, the distance measure representing a visual difference between the first and second consecutive pages.

28. The machine readable storage media of claim 23, further comprising clustering of a plurality of pages of the document into one or more clusters based on visual similarities of the pages with respect to the at least one visual feature.

29. The machine readable storage media of claim 23, further comprising using visual features to reveal a transition from a first page to a second page of a document.

30. The machine readable storage media of claim 23, wherein ranking the pages includes a correction mechanism.

31. The machine readable storage media of claim 23, wherein a scheme showing one of a plurality of pages in a document and a plurality of documents is by one of a linear display, a line of icons, and as a stack.

32. A method comprising:

extracting at least one visual feature from a document, the document having a plurality of Pages, wherein at least one visual feature is weighted based on one of gradations and a location of the visual feature;

grouping the pages of the document based on a similarity relationship between the respective page and the at least one visual feature;

selecting representative pages from groups that are significantly different from a remainder of the pages of the respective group; and displaying the representative pages for representing the pages of the respective group.

\* \* \* \* \*